US012368258B2

(12) United States Patent
Chen

(10) Patent No.: US 12,368,258 B2
(45) Date of Patent: Jul. 22, 2025

(54) COAXIAL CONNECTOR WITH A MOVABLE TERMINAL ASSEMBLY

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Ming-Ching Chen, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 442 days.

(21) Appl. No.: 17/981,474

(22) Filed: Nov. 7, 2022

(65) Prior Publication Data

US 2023/0143493 A1 May 11, 2023

(30) Foreign Application Priority Data

Nov. 10, 2021 (CN) ......................... 202111325304.1

(51) Int. Cl.
*H01R 13/11* (2006.01)
*H01R 24/50* (2011.01)
*H01R 24/54* (2011.01)
*H01R 103/00* (2006.01)

(52) U.S. Cl.
CPC ............. *H01R 13/11* (2013.01); *H01R 24/50* (2013.01); *H01R 24/54* (2013.01); *H01R 2103/00* (2013.01)

(58) Field of Classification Search
CPC ........ H01R 13/11; H01R 13/10; H01R 13/02; H01R 13/111; H01R 13/15; H01R 13/187; H01R 13/245; H01R 13/2457; H01R 24/50; H01R 24/38; H01R 24/54; H01R 2102/00
See application file for complete search history.

(56) References Cited

U.S. PATENT DOCUMENTS 5,775,960 A * 7/1998 Saito .................... H01R 13/187 439/843
6,994,600 B2 * 2/2006 Coulon ................ H01R 13/187 439/843
(Continued)

FOREIGN PATENT DOCUMENTS

| | | | |
|---|---|---|---|
| CN | 110247267 | B | 7/2021 |
| TW | I594525 | B | 8/2017 |

(Continued)

*Primary Examiner* — Harshad C Patel
(74) *Attorney, Agent, or Firm* — Ming Chieh Chang

(57) ABSTRACT

A coaxial connector includes a case having an inserting opening, a terminal assembly received in the case and defining a mating opening facing the inserting opening of the case, and an elastic member disposed between the case and the terminal assembly. The elastic member provides elastic forces in a radial direction of the terminal assembly to keep the terminal assembly in a first position in a free state of the terminal assembly, and the elastic member push the terminal assembly to shift to a second position different from the first position in the radial direction in a mated state of terminal assembly when the coaxial connector is mated with a complementary connector.

18 Claims, 21 Drawing Sheets

(56) References Cited

U.S. PATENT DOCUMENTS

| | | | | |
|---|---|---|---|---|
| 7,086,902 | B1 * | 8/2006 | Yang | H01R 12/716 439/876 |
| 7,121,864 | B1 * | 10/2006 | Yang | H04N 23/54 439/331 |
| 7,160,116 | B2 * | 1/2007 | Li | H04N 1/00307 439/73 |
| 7,179,126 | B2 * | 2/2007 | Chen | H01R 12/714 439/71 |
| 7,241,160 | B2 * | 7/2007 | Yang | H01R 13/6582 439/71 |
| 7,261,599 | B2 * | 8/2007 | Li | H05K 7/1053 439/607.05 |
| 7,281,954 | B1 * | 10/2007 | Hashiguchi | H01R 13/2442 439/71 |
| 7,288,003 | B2 * | 10/2007 | Ono | H01R 12/7076 439/70 |
| 7,435,139 | B2 * | 10/2008 | Yang | H01R 13/2442 439/607.01 |
| 7,497,733 | B1 * | 3/2009 | Van der Steen | H01R 12/00 439/71 |
| 7,594,818 | B1 * | 9/2009 | Asai | H01R 13/2442 439/71 |
| 7,682,159 | B2 * | 3/2010 | Huang | G03B 17/02 439/71 |
| 7,794,253 | B2 * | 9/2010 | Wang | H01R 24/46 439/63 |
| 7,819,696 | B2 * | 10/2010 | Wu | H01R 12/592 439/71 |
| 7,901,217 | B2 * | 3/2011 | Asai | H01R 13/2442 439/71 |
| 7,955,129 | B2 * | 6/2011 | Hu | H01R 13/2442 439/607.01 |
| 8,011,934 | B2 * | 9/2011 | Tu | H04N 23/57 439/71 |
| 8,085,344 | B2 * | 12/2011 | Mizumura | H01R 12/716 348/374 |
| 8,113,857 | B1 * | 2/2012 | Huang | H01R 24/50 439/188 |
| 8,766,123 | B2 * | 7/2014 | Hu | H01H 13/14 200/345 |
| 9,071,019 | B2 * | 6/2015 | Burris | H01R 13/639 |
| 9,147,963 | B2 * | 9/2015 | Balcer | H01R 9/0524 |
| 2005/0048829 | A1 * | 3/2005 | Nishio | H04N 23/54 348/E5.025 |
| 2006/0216996 | A1 * | 9/2006 | Chen | H01R 13/6582 439/71 |
| 2006/0258219 | A1 * | 11/2006 | Chen | H01R 13/6582 439/607.01 |
| 2006/0270276 | A1 * | 11/2006 | Li | H01R 13/2442 439/71 |
| 2007/0026735 | A1 * | 2/2007 | Pyron | B60R 16/0222 439/584 |
| 2007/0254525 | A1 * | 11/2007 | Pyron | H02G 3/22 439/584 |
| 2020/0119470 | A1 | 4/2020 | Yanase et al. | |
| 2021/0013677 | A1 | 1/2021 | Chen et al. | |
| 2021/0119367 | A1 * | 4/2021 | Chen | H01R 43/18 |
| 2021/0344146 | A1 * | 11/2021 | Chen | H01R 24/40 |
| 2023/0223723 | A1 * | 7/2023 | Chen | H01R 24/50 439/578 |

FOREIGN PATENT DOCUMENTS

| | | | |
|---|---|---|---|
| TW | I605649 | B | 11/2017 |
| WO | 2018047227 | A1 | 3/2018 |
| WO | 2020215742 | A1 | 10/2020 |

* cited by examiner

COAXIAL CONNECTOR WITH A MOVABLE TERMINAL ASSEMBLY

BACKGROUND OF THE INVENTION

Field of the Invention

The present invention generally relates to a coaxial connector which has a movable terminal assembly and an elastic member keeping the terminal assembly in a suitable position in a radial direction thereof.

Description of Related Arts

In current coaxial connector, a terminal is steadily mounted on a printed circuit or other elements for insertion by a plug pin of a complementary connector, which needs the terminal to have elastic contacting portions not only for elastic contact but also for accurate guidance of the plug pin. Therefore, the coaxial connector has to be accurately assembled.

Therefore, there is a need for improving the coaxial connector.

SUMMARY OF THE INVENTION

A coaxial connector comprises: a case having an inserting opening; a terminal assembly received in the case and defining a mating opening facing the inserting opening of the case; and an elastic member disposed between the case and the terminal assembly; wherein the elastic member provides elastic forces in a radial direction of the terminal assembly to keep the terminal assembly in a first position in a free state of the terminal assembly, and the elastic member shifts the terminal assembly to a second position different from the first position in the radial direction in a mated state of the terminal assembly when the coaxial connector is mated with a complementary connector.

A coaxial connector comprises: a case comprising a top wall defining an inserting opening, a sidewall and a bottom commonly defining a receiving cavity, the bottom wall being made from conductive material and adapted for being non-moveably and electrically mounted on a printed circuit board; a terminal assembly moveably received in the receiving cavity and electrically connected with the bottom wall of the case; and an elastic member disposed in the receiving cavity; wherein the elastic member elastically presses against the terminal assembly to urge the terminal assembly to shift in a radial direction of the coaxial connector.

A coaxial connector comprises: a case comprising a top wall defining an inserting opening, a sidewall and a bottom wall commonly defining a receiving cavity, the bottom wall being made from conductive material and adapted for being non-moveably and electrically mounted on a printed circuit board; a terminal assembly received in the receiving cavity and electrically connected with the bottom wall of the case; and an elastic member disposed in the receiving cavity; wherein the elastic member elastically presses against the terminal assembly and pushes the terminal assembly to shift to a position as determined by an inserted complementary connector.

DETAILED DESCRIPTION OF THE DRAWINGS

Figure 1:
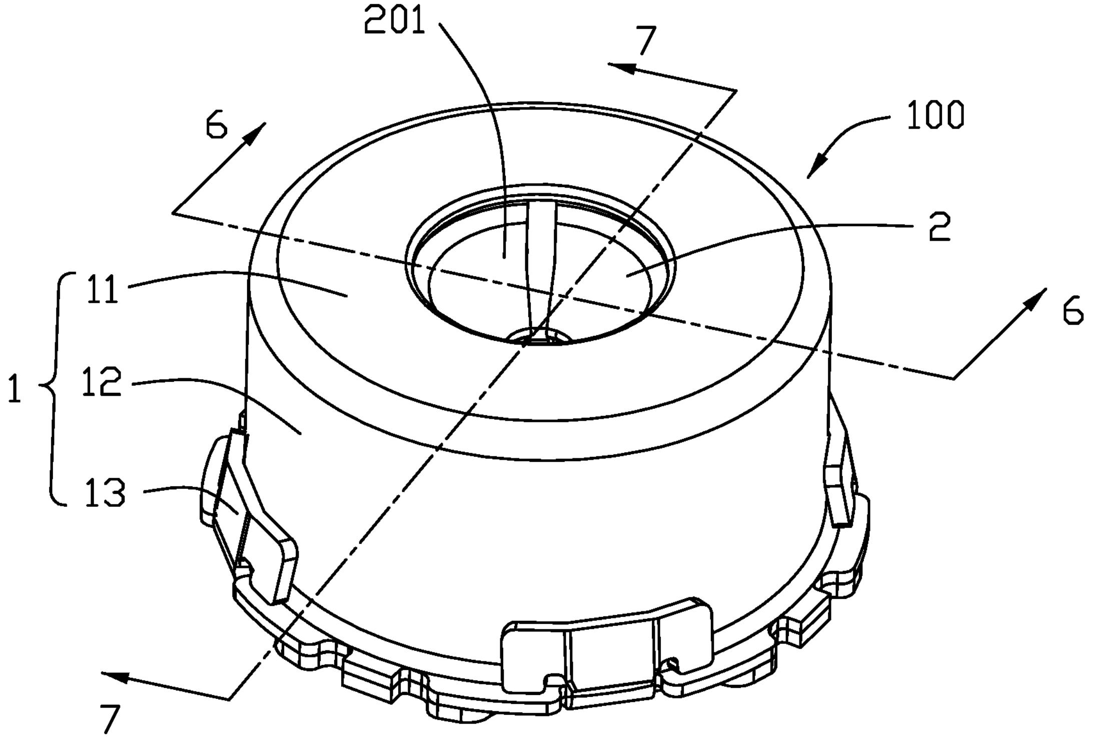
FIG. 1 is a perspective view of a coaxial connector of a first embodiment of this present invention.
Figure 2:
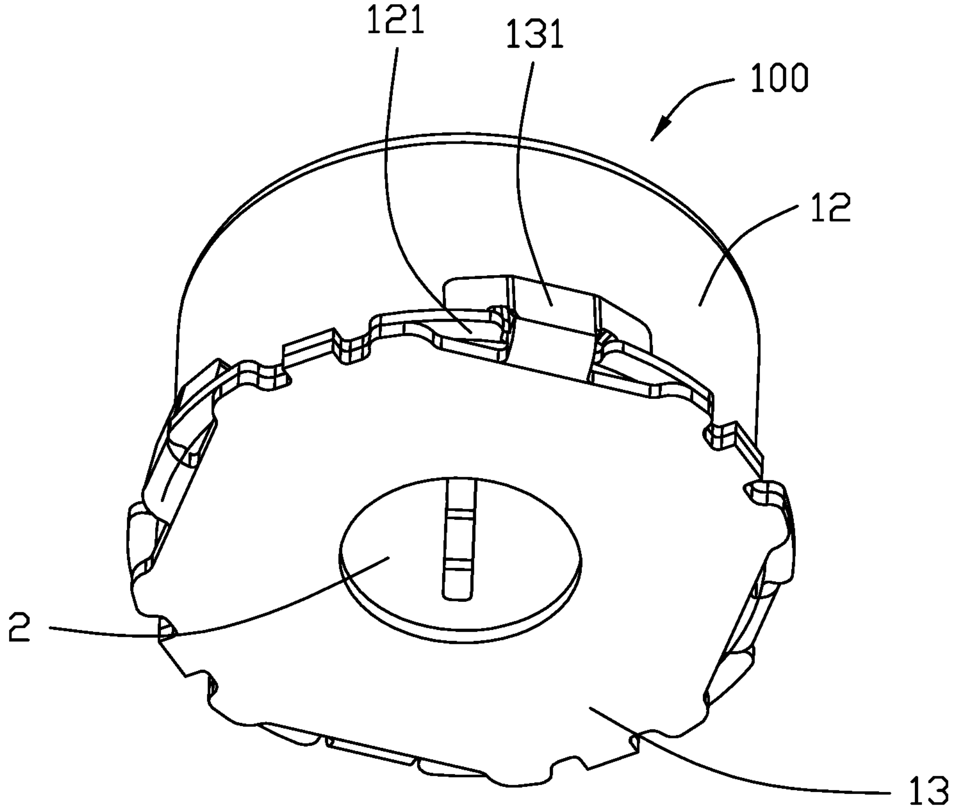
FIG. 2 is an another perspective view of the coaxial connector of FIG. 1.
Figure 3:
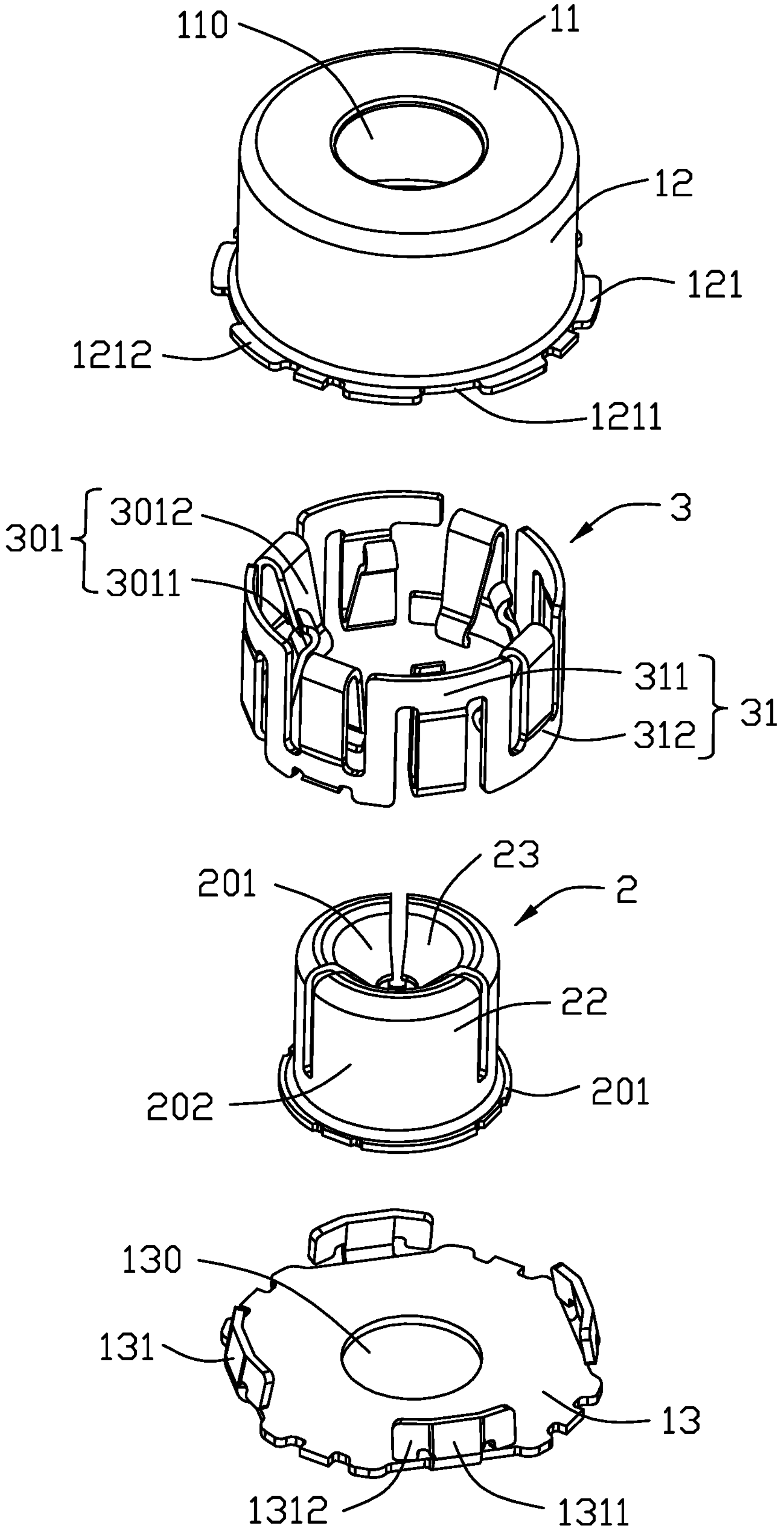
FIG. 3 is an exploded perspective view of the coaxial connector of FIG. 1.
Figure 4:
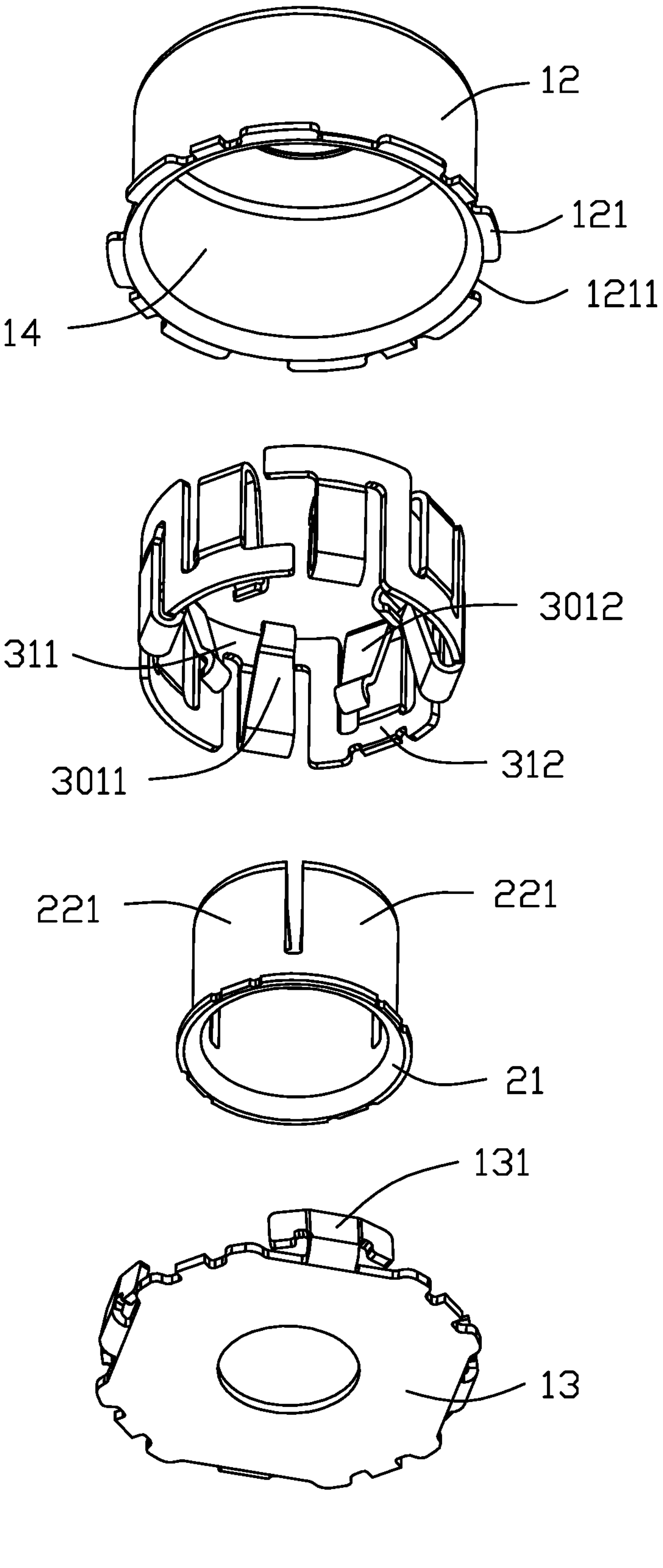
FIG. 4 is an another exploded perspective view of the coaxial connector of FIG. 3.
Figure 5:
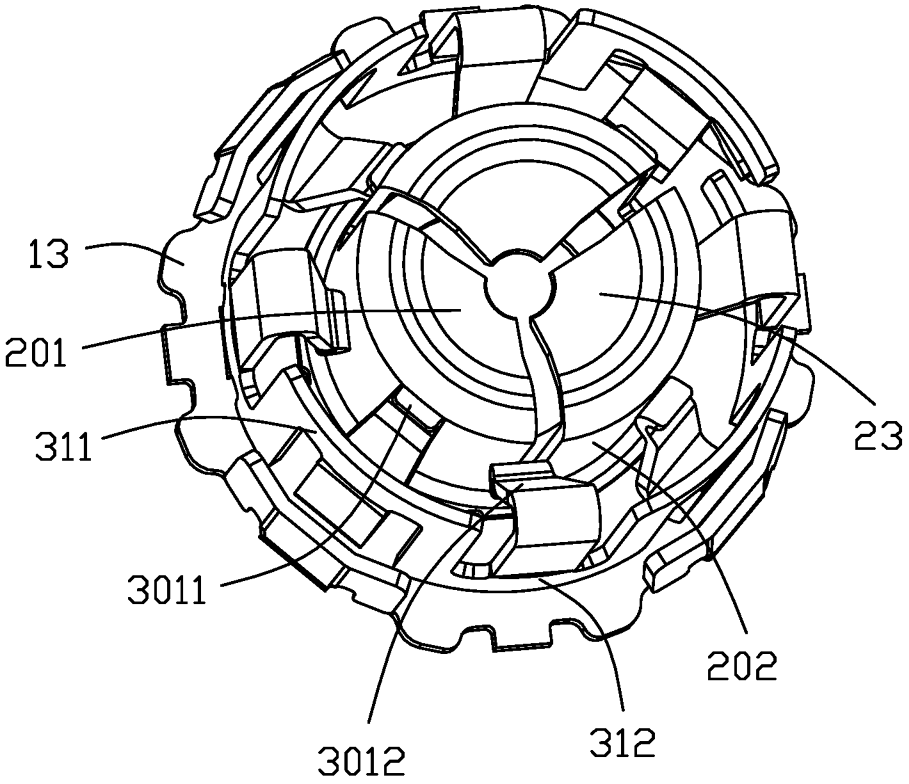
FIG. 5 is a perspective view of part of the coaxial connector of FIG. 1.
Figure 6:
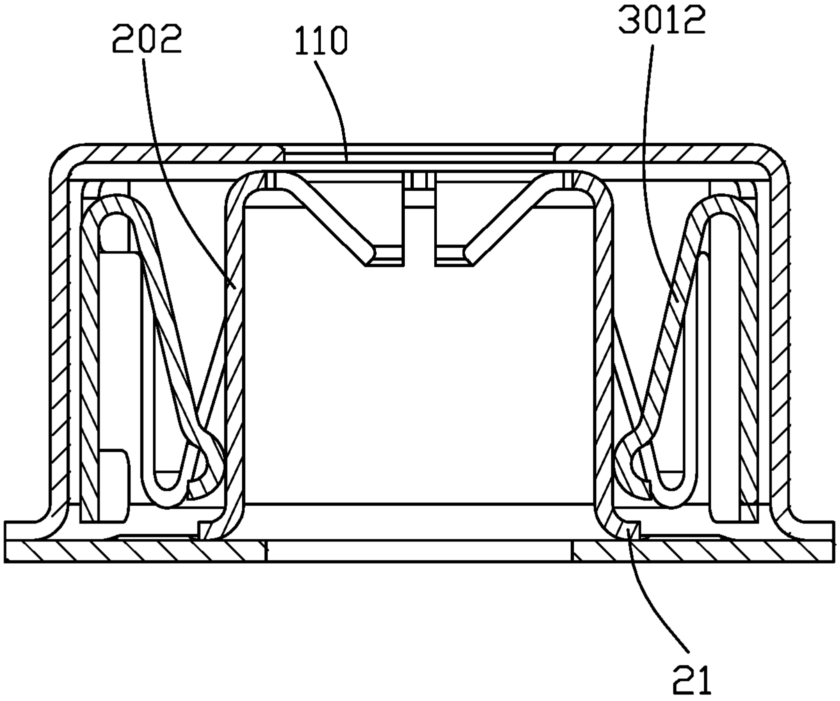
FIG. 6 is a cross-section view of the coaxial connector of FIG. 1 taken along broken lines 6-6.

Reference will now be made to the drawing figures to describe the preferred embodiment of the present invention in detail.

Figure 7:
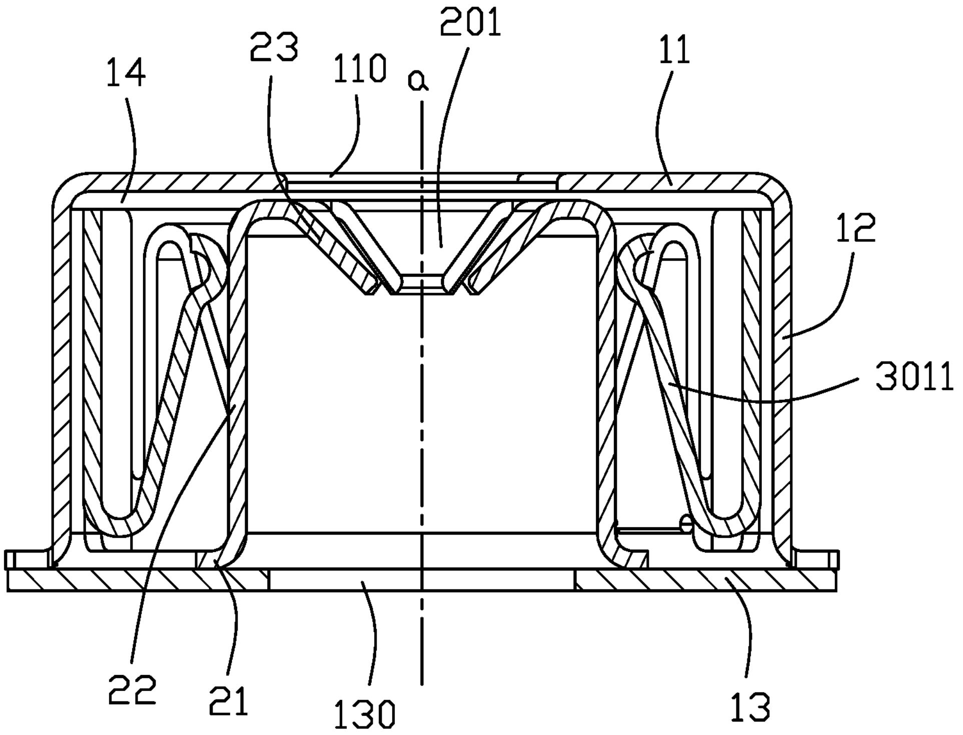
FIG. 7 is a cross-section view of the coaxial connector of FIG. 1 taken along broken lines 7-7, wherein the terminal assemble is in a first position.
Figure 8:
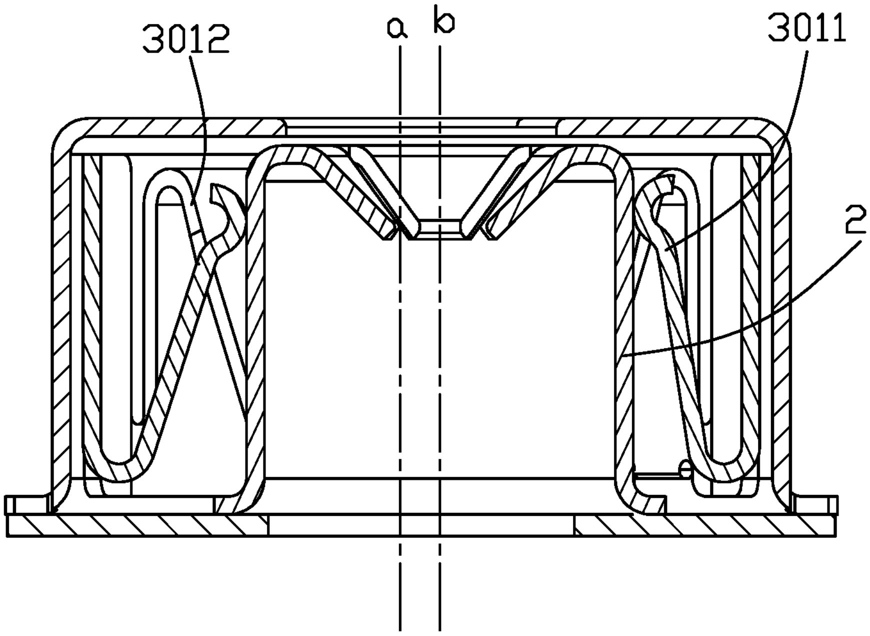
FIG. 8 is similar to FIG. 7, showing the terminal assembly is in a second position.
Figure 9:
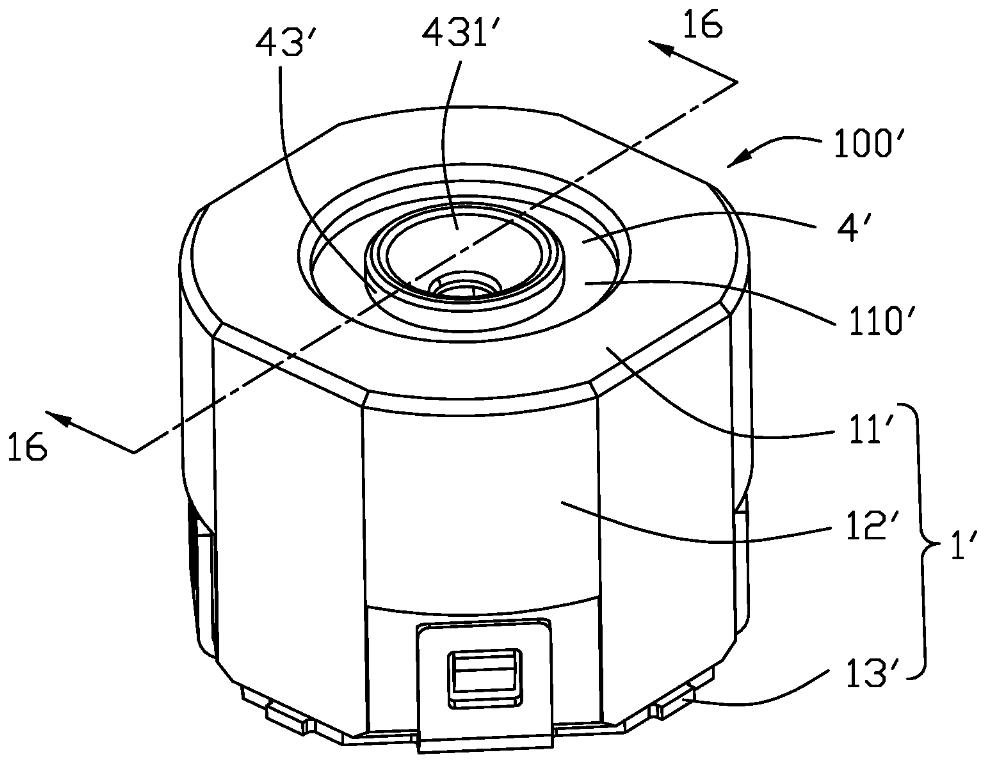
FIG. 9 is a perspective view of a coaxial connector of a second embodiment of this present invention.
Figure 10:
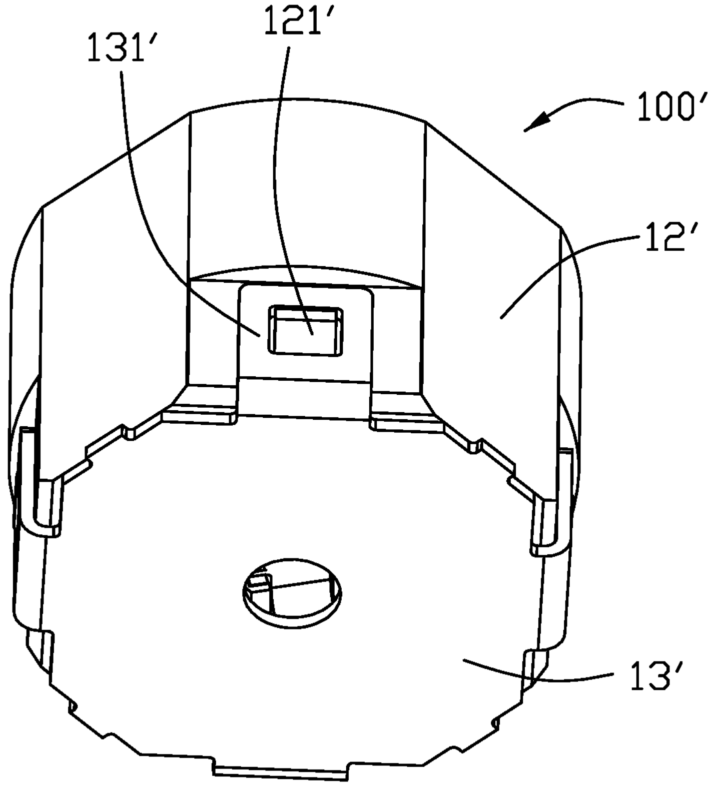
FIG. 10 is another perspective view of the coaxial connector of FIG. 9.
Figure 11:
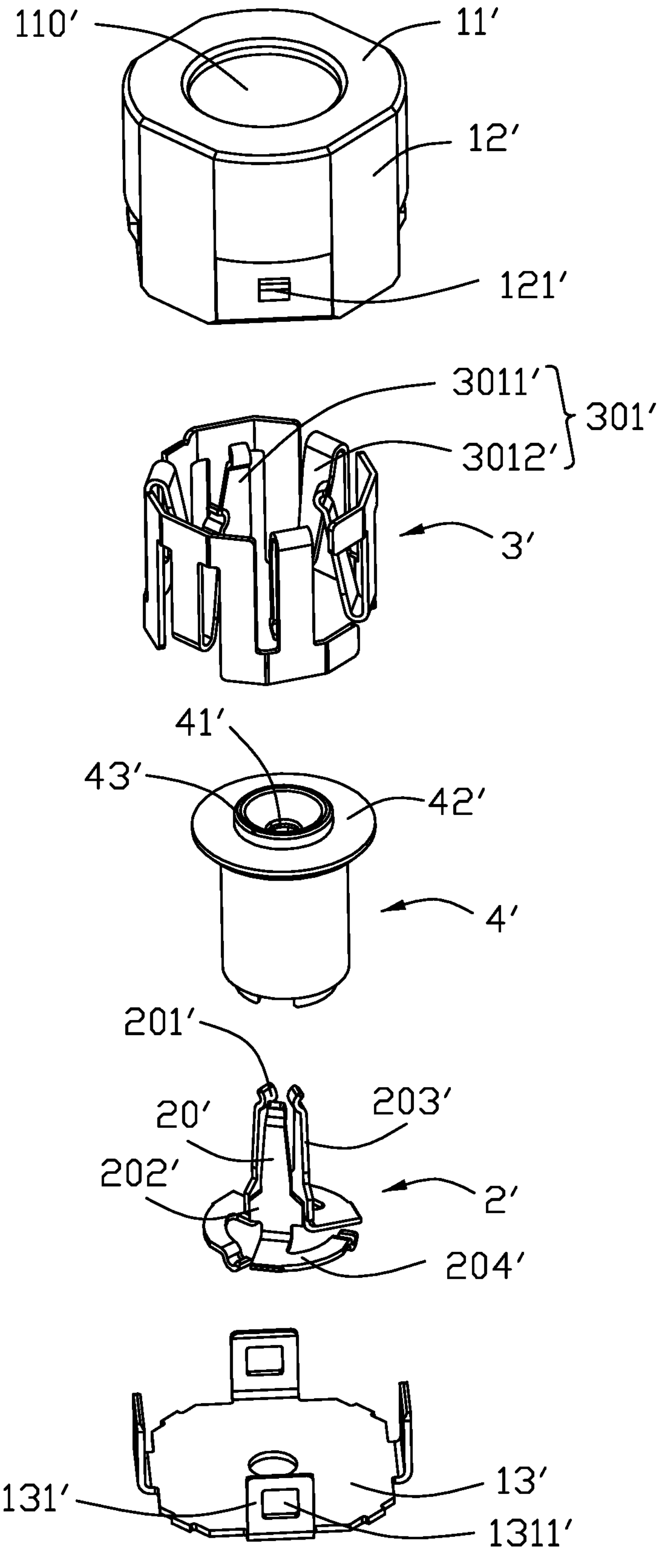
FIG. 11 is an exploded perspective view of the coaxial connector of FIG. 9.
Figure 12:
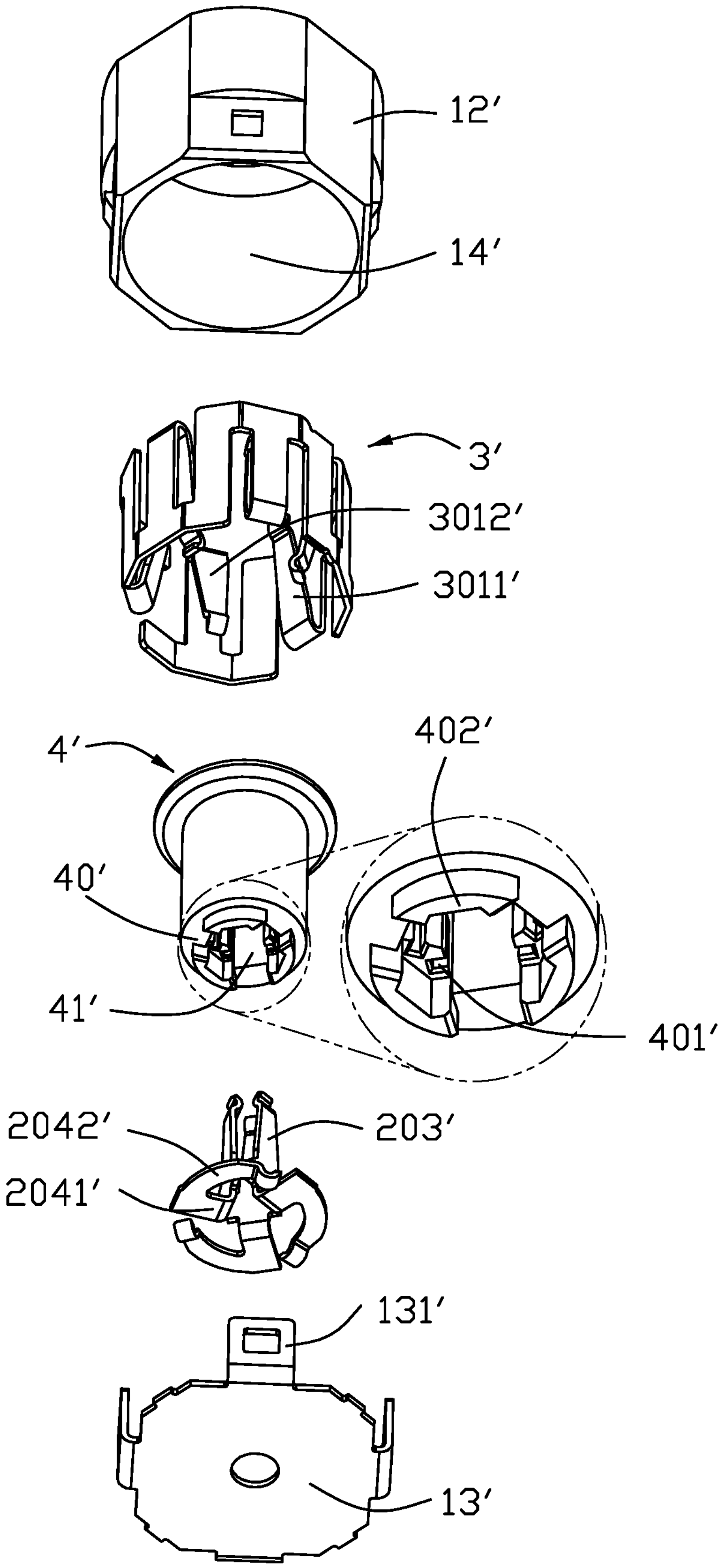
FIG. 12 is another exploded perspective view of the coaxial connector of FIG. 11.
Figure 13:
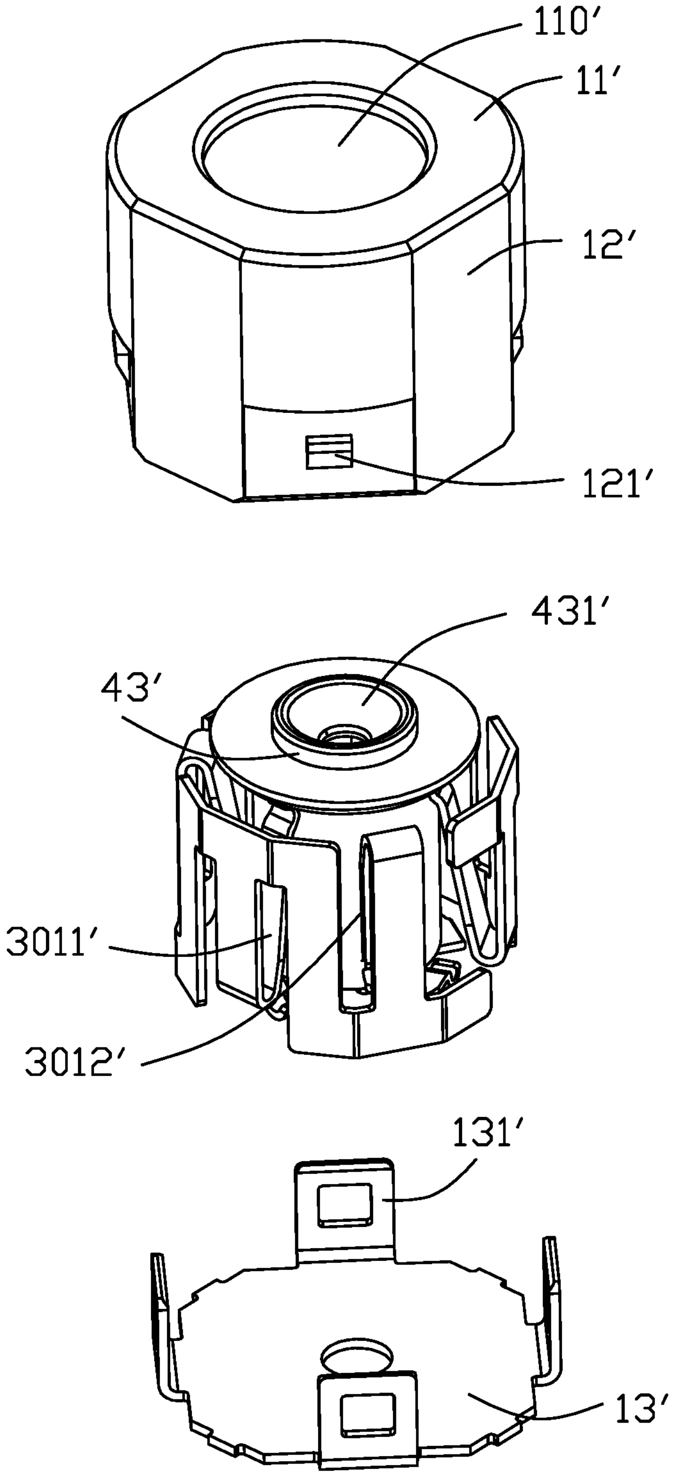
FIG. 13 is an exploded perspective view of part of the coaxial connector of FIG. 9.
Figure 14:
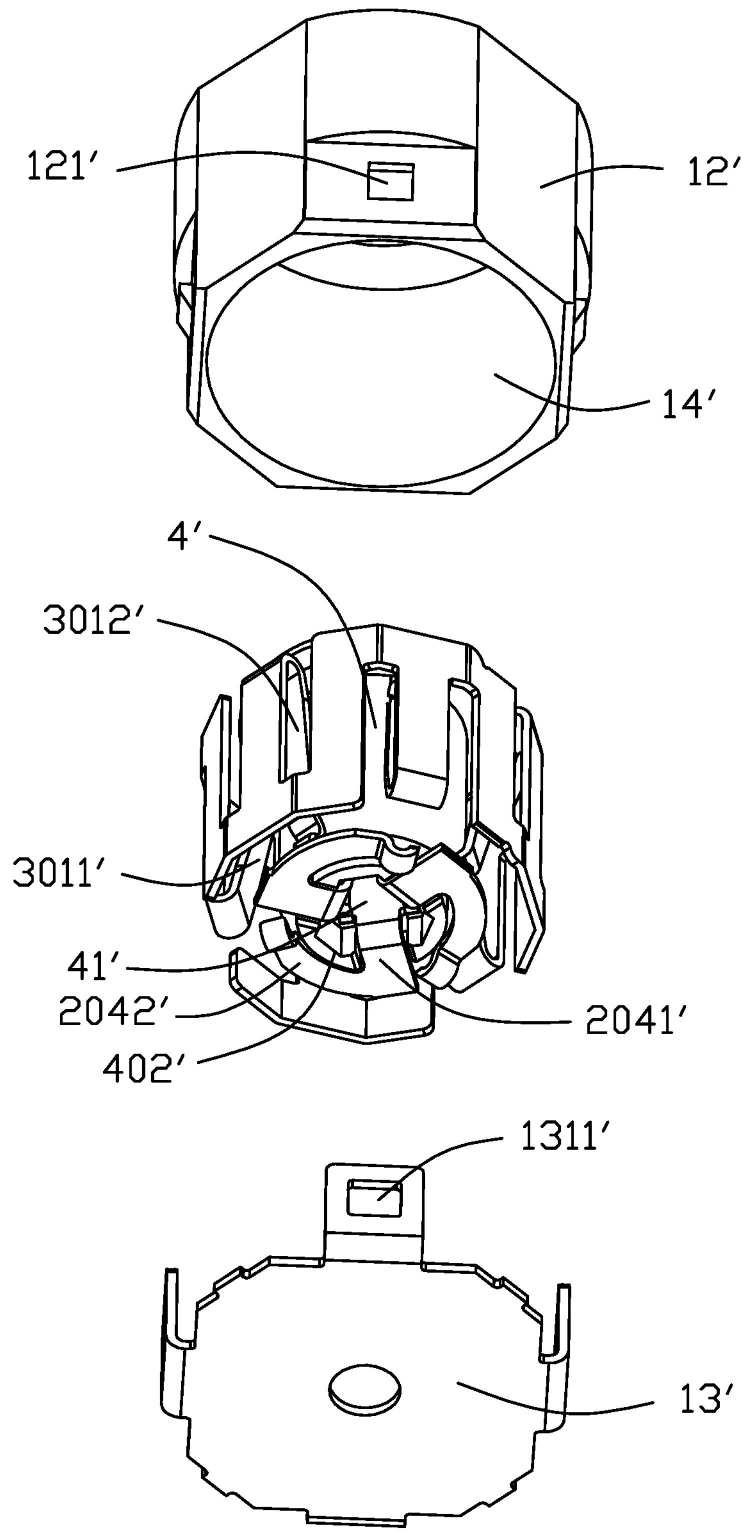
FIG. 14 is an another exploded perspective view of the coaxial connector of FIG. 13.
Figure 15:
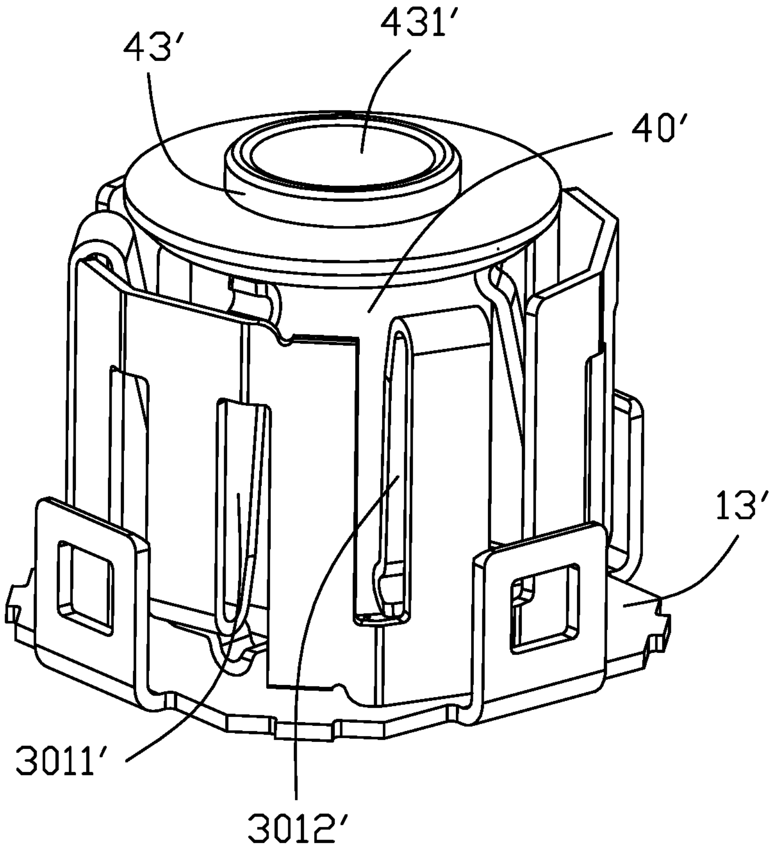
FIG. 15 is a perspective view of part of the coaxial connector of FIG. 9.
Figure 16:
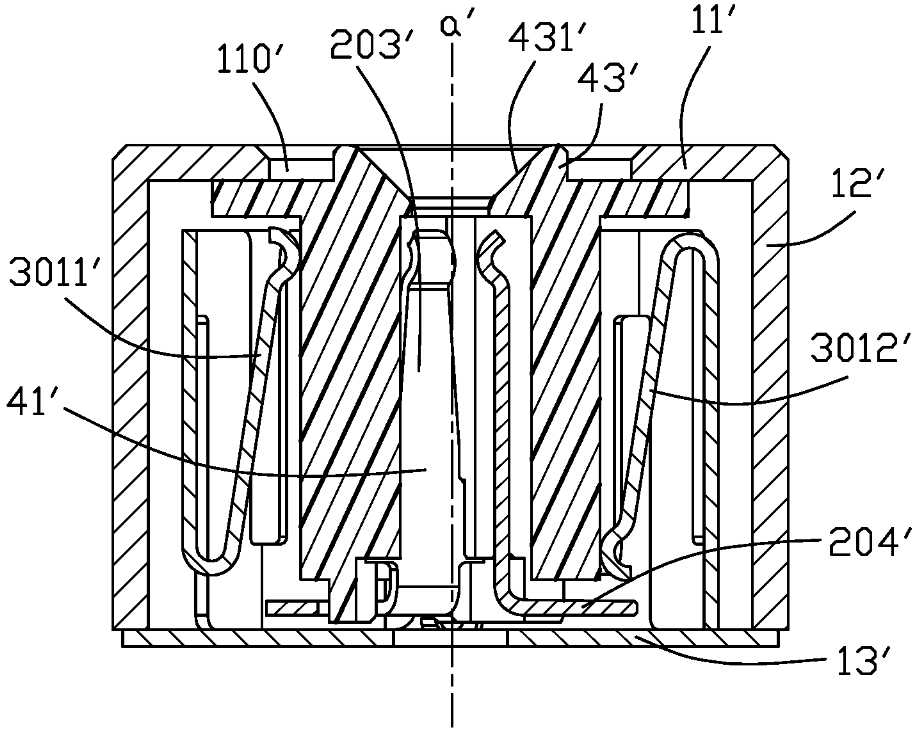
FIG. 16 is a cross-section view of the coaxial connector of FIG. 9 taken along broken lines 16-16, wherein the terminal assembly is in a first position.
Figure 17:
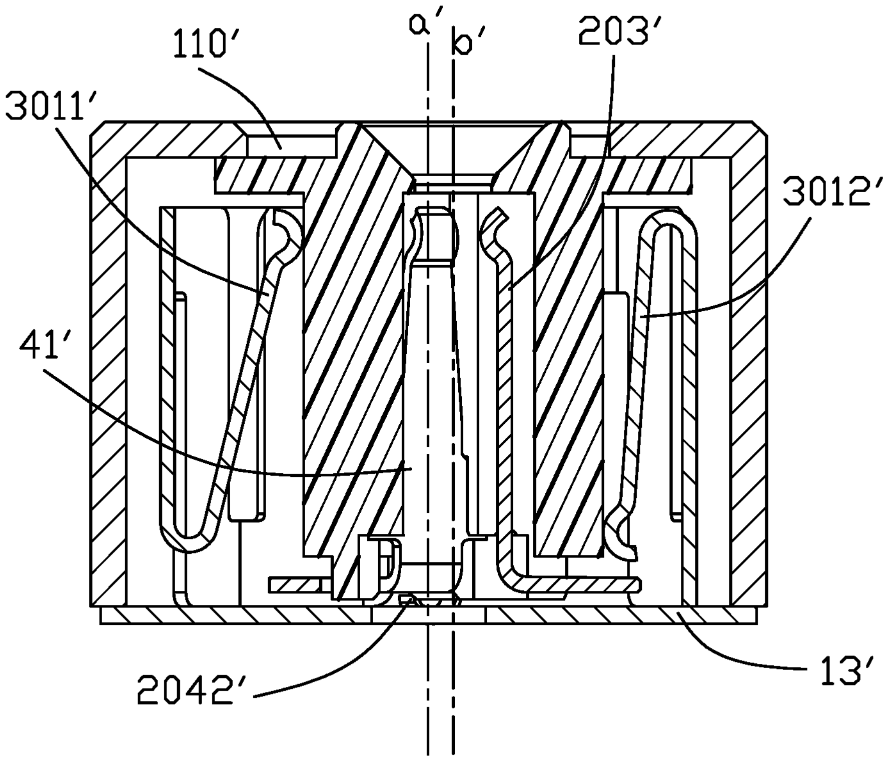
FIG. 17 is similar to FIG. 16, wherein the terminal assembly is in a second position.
Figure 18:
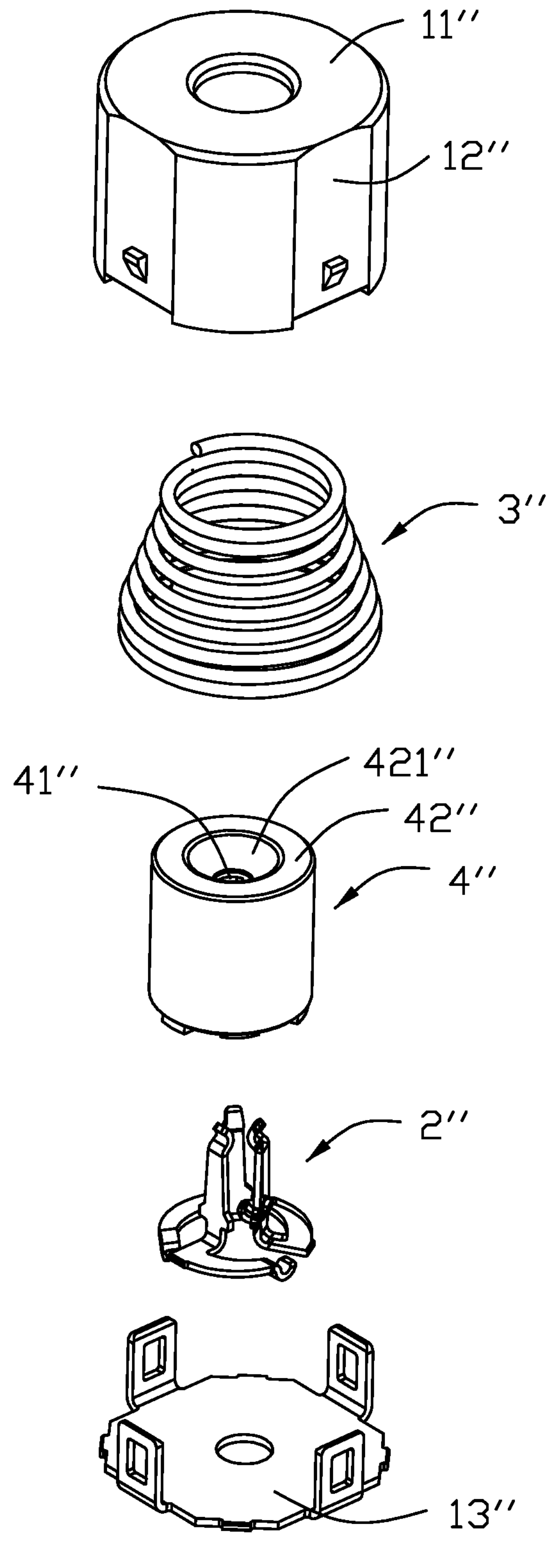
FIG. 18 is a partly exploded perspective view of a coaxial connector of a third embodiment of this present invention.
Figure 19:
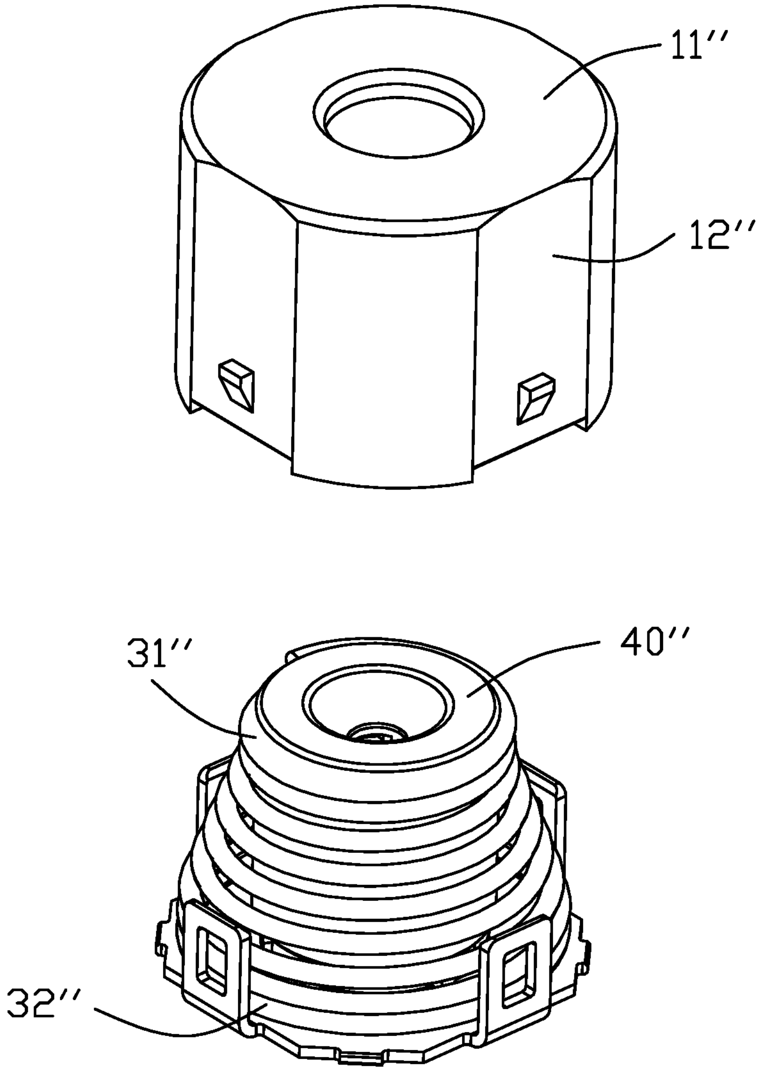
FIG. 19 is a further exploded perspective view of the coaxial connector of FIG. 18.
Figure 20:
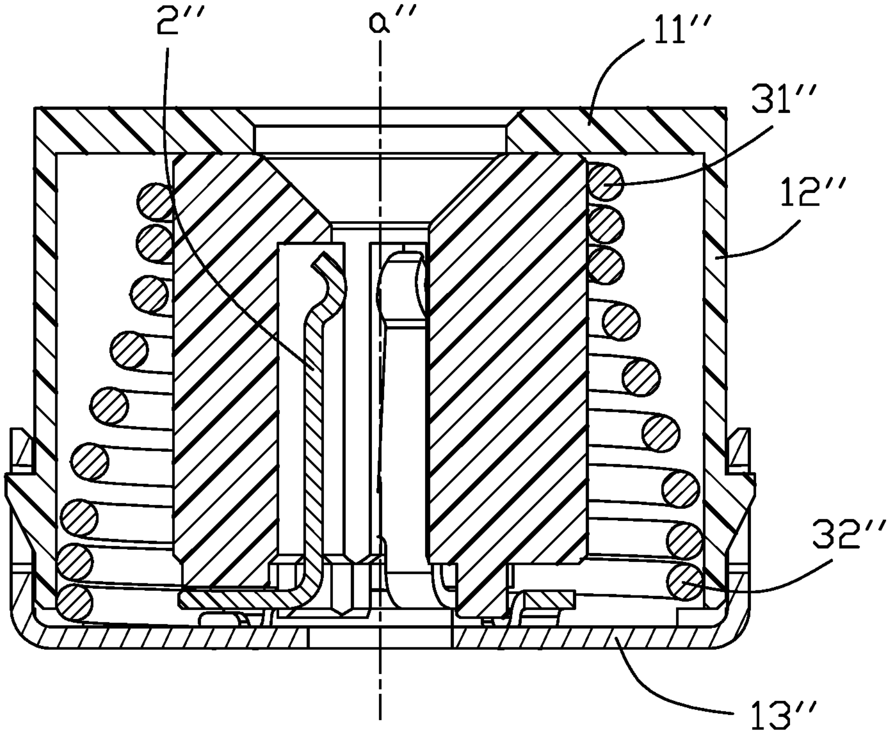
FIG. 20 is a cross-section view of the coaxial connector showing the terminal assembly is in a first position.
Figure 21:
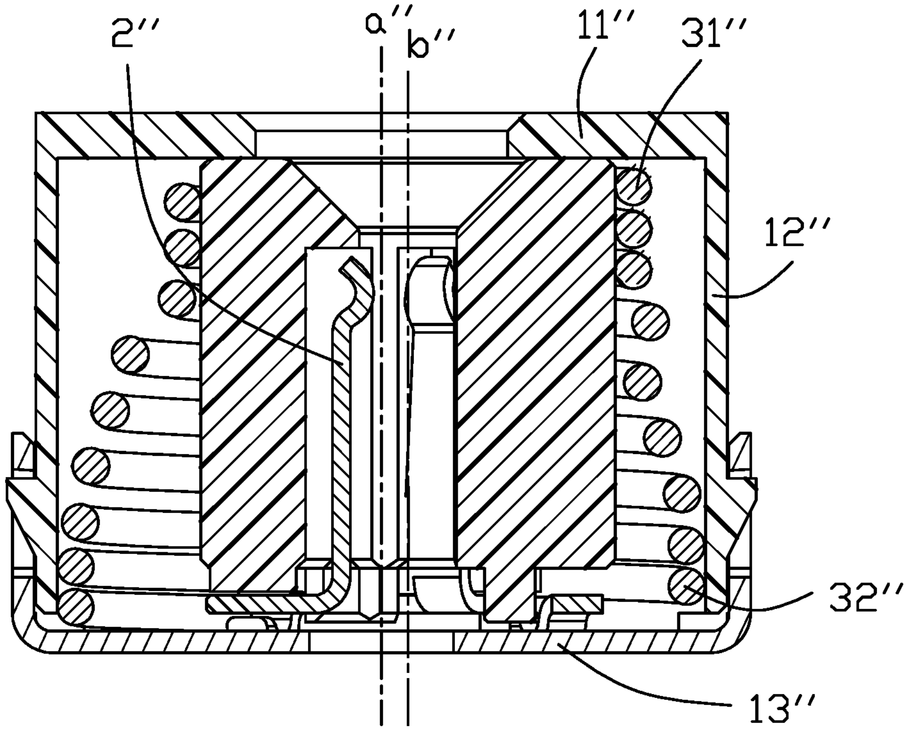
FIG. 21 is a cross-section view of the coaxial connector showing the terminal assembly is in a second position.

Referring to FIGS. 1 to 8, a coaxial connector 100 of a first embodiment of this present invention includes a metallic case 1, and a terminal assembly 2 and an elastic member 3 commonly received within the case 1. As best shown in FIGS. 7-8, the elastic member 3 provides radial elastic forces to keep the terminal assembly 2 in a first position in a free state with no complementary connector inserting into the coaxial connector 100. The elastic member 3 is deformed and pushes the terminal assembly 2 to shift to a second position b along a radial direction in a mated state when the coaxial connector is inserted with the complementary connector, like a plug pin (not shown). The terminal assembly 2 has a radial offset when the coaxial connector is mated with the plug pin.

The case 1 includes a top wall 11, a sidewall 12 like a tube in this embodiment and a bottom wall 13 commonly defining a receiving cavity 14 thereamong for receiving the terminal assembly 2 and the elastic member 3. The top wall 11 defines an inserting opening 110 and the terminal assembly 2 defines a mating opening 201 facing the inserting opening 110, the plug pin go across the inserting opening 110 and the mating opening 201. The bottom wall 13 defines a detecting opening 130 in a center thereof, for detecting the coaxial connector 100 in a normal stature or not.

The elastic member 3 prefers to be made from metal material, such as copper alloy and in a tube shape. The elastic member 3 includes a tube base 31 and a plurality of elastic arms 301 arranged along an inside of the tube base 31, the plurality of elastic arm 302 offer elastic forces against the terminal assembly 2 and keep the terminal assembly 2 in the first position a. When the terminal assembly 2 is urged by external force and shift, the plurality of elastic arms 301 are deformed and urged the terminal assembly 2 move radially to the second position b, the position can be any positions which are radially offset from the first position a. In this embodiment, in the free state of the coaxial connector 100, the elastic arms 301 are arranged in a ring shape and press inward against a periphery of the terminal assembly 2 in a radial direction, that is, the elastic offer elastic force against the terminal assembly 2 to keep the terminal assembly 2 in the first position a. Alternatively, the elastic arms 301 press against an inside of the terminal assembly 2.

The terminal assembly 2 includes a tube terminal in a tube shape, which includes a tube base 22, a plurality of contacting portions 23 bending inwards from a top edge of the tube base 22, and a bottom ring 21 folded outwards from a bottom edge of the tube base 22. The contacting portions 23 are distinct from each other and slant downward and centrally, thereby defining the mating opening 201. The elastic arms 301 press against the outer periphery of the tube base 22 along the radial direction thereof. Preferably, the tube base 22 defines several slit 221 from the top edge of the tube base 22, but the slits 221 do not go through the bottom ring 21, thereby separating the tube base 22 into three portions and increasing a flexibility of the tube base 22. Three contacting portions 23 extend from the three portions of sidewalls 22 respectively, thereby increasing the elastic force of the contacting portions 23.

In this embodiment, the bottom wall 13 of the case 1 is made from metallic plate and adapted for being soldered with a printed board (not shown). The bottom wall 13 is preferably made from copper alloy. The bottom ring 21 is electrically connecting with the bottom wall 13. The top wall 11 and the sidewall 12 are integral and also made from metallic material. The bottom wall 13 is fitly assembled underneath and with the sidewall 12. The sidewall 12 defines a bottom ring 121 with a plurality of coves 121, the bottom wall 13 defines a plurality of retaining tabs 131 bending upwards. The retaining tabs 131 are inserting into and fitly retained with the coves 121. The retaining tab 131 includes a first portion 1311 going through the cove 121 and a second portion 1312 extending transversely and locking with an upper face 1212 of the bottom ring 121. Please notes, the top wall 11 and the sidewall 12 alternate other material, like plastic material.

The elastic member 3 includes a tube base 31 in a tube shape and the elastic arms 302 bending from the tube base 31, the tube base 13 ring around the terminal assembly 2. The plurality of elastic arms 301 includes first elastic arms 3011 extending upwards front a bottom edge of the tube base 31 and second elastic arms 3012 extending downwards from an upper edge of the tube base 31. The first elastic arms and the second elastic arms extend in opposite directions, thereby offering opposite forces to steadily keep the terminal assembly 2. Preferably, the first and second elastic arms 3011, 3012 alternate one by one. The tube base 31 further defines several slits therein, at least two first slits 311 open downwards and construe a first portion 313 from which the first elastic arm 3011 bends, at least two second slits 312 open upwards and construe a second portion 314 from which the second elastic arm 3012 bend. The first portion 313 and the first elastic arms 3011 shapes in V shape to increase elastic performance and deform performance of the elastic arms. Similarly, the second portion 314 and the second elastic arms 3012 shapes in inverted V shape to increase elastic performance and deform performance of the elastic arms.

Referring to FIGS. 9 to 17 illustrating a coaxial connector 100' of a second embodiment of this present invention, the terminal assembly 2' of the coaxial connector 100' further includes an insulating tube 4' retaining and covering the terminal assembly 2'. The elastic member 3' is set around the insulating tube 4' and press against the insulating tube 4' in the radial direction to keep the terminal assembly 2'. The elastic member 3' is same to that of the first embodiment. In the free state, the elastic arms 301' press against the outer periphery of the tube 4' to keep the terminal assembly 2' in a first position a'. When the terminal assembly 2' is urged to move, the elastic arms 301' are deformed and push the terminal assembly 2' shift to a second position b' in the radial direction. The elastic member 4' drive the terminal assembly 2' to be radial offset.

The insulating tube 4' defines a receiving cavity 41' running through an upper end and a lower end thereof. The terminal assembly 2' includes several terminal units 20' distinct from each other, and each includes a retaining portion 202' retained in the tube base 40' of the plastic tube 4', elastic contacting portion 203' protruding in the receiving cavity 41' and elastic connecting portion 204' extending downward out of the lower end of the plastic tube 4'. The plurality of contacting portions 203' construes a mating opening 201'. The contacting portions 203' extend upwards from the upper edge of the retaining portions 202', the connecting portions 204' extend downwards from the lower edge of the retaining portions and extend in a horizontal direction. Preferably, the top wall 11' and the sidewall 13' are made from plastic material and integrated. The bottom wall 13' is made from a metal plate, like copper alloy, for being soldered with a printed circuit. The sidewall 12' defines a plurality of bosses 121' at a lower portion of the periphery thereof, to lock with holes 1311' defined on retaining tabs 131 bending from the bottom walls 13'. The insulating tube 4' with the terminal assembly 2', and the elastic member 4' are received in the receiving cavity 14' defined by the top wall 11' and sidewall 12' and the bottom walls 13'. The connecting portions 204' are electrically connecting with the bottom wall 13'. Alternatively, the connecting portions can touch the printed circuit board to establish an electric path.

In this second embodiment, the upper face 42' of the insulating tube 4' is located below the top wall 11', a raised portion 43' protrude from the upper face 42' of the insulating tube 4', which has a small diameter than that of the opening 110'. The receiving cavity 41' goes through the raised portion 43'. That means the raised portion 43' is in a ring shape and defines an inside 431' in an up wide and down narrow form. The sidewall 40' of the insulating tube 4' defines retaining slots 401' and the retaining portions 202' are received and retained in the retaining slot 401'. The connecting portion 204' includes a horizontal portion 2041' extending outwards and horizontally from the lower edge of the retaining portion and an arc portion 2042' extending from one side edge of the horizontal portion for pressing against the bottom wall 13'. The arc portion of each terminal unit 20' directs clockwise or counterclockwise, all the arc portions substantially construe a ring shape, that is, the heads and the ends of adjacent arc portions 2042' are near to each other. The sidewall 40' of the insulating tube 4' defines limiting bumps 402' at the lower end thereof, the horizontal portions are retained between every two limiting bumps 402', and the arc portions 2042' are located down outsides of the limiting bumps 402', thereby increase the steady of the connecting portion during the connecting portions shift relative to the bottom wall 13'.

FIGS. 18 to 21 illustrate a coaxial connector of a third embodiment of this present invention, which is similar to the second embodiment. The insulating tube 4" has no raised portions at the upper face 42' thereof, and the inside 421'. The elastic member 3" is a type of tower shape coil spring. The diameters of the coil spring gradually become smaller from lower to upper end. The coil spring has a smallest coil 31' and a largest coil 32, the smallest coil 31" is set on the insulating tubes 4", and lower coils are larger than the insulating tube 4" so as to separate from the tube. The largest coil 32' is seated on the bottom wall 13' and limited by an inside of the sidewall of the case 1". In a free state, the terminal assembly 2 is kept in the first position a" by the coil spring. The coil spring push the terminal assembly 2 shift to the second position b" during the terminal assembly and/or the insulating tube 4" is urged to move. Please notes, the contacting portions can select to be non-elastic.

Understandingly, the bottom wall of the case is non-movably mounted on the circuit board and the terminal assembly is kept mechanically and electrically connected with the metallic bottom wall of the case, while the terminal assembly can shift slightly, especially in the radial direction and the elastic member push the terminal assembly return to a suitable position. Therefore, when the complementary connector is inserted with the terminal assembly, the terminal assembly can adjust by itself, decreasing an accurate position requirement of the terminal assembly compared to the circuit board.

However, the disclosure is illustrative only, changes may be made in detail, especially in matter of shape, size, and arrangement of parts within the principles of the invention.

The invention claimed is:

1. A coaxial connector comprising:

a case having an inserting opening;

a terminal assembly received in the case and defining a mating opening facing the inserting opening of the case; and an elastic member disposed between the case and the terminal assembly;

wherein the elastic member provides elastic forces in a radial direction of the terminal assembly to keep the terminal assembly in a first position in a free state of the terminal assembly, and the elastic member shifts the terminal assembly to a second position different from the first position in the radial direction in a mated state of the terminal assembly when the coaxial connector is mated with a complementary connector.

2. The coaxial connector as claimed in claim 1, wherein the elastic member defines a plurality of elastic arms slanting towards the terminal assembly, and the plurality of elastic arms keep the terminal assembly in the first position during the free state while push the terminal assembly to the second position during the mating state.

3. The coaxial connector as claimed in claim 2, wherein the elastic member comprises a tube base and the plurality of elastic arms punched inwards from the tube base.

4. The coaxial connector as claimed in claim 1, wherein:

the case comprises a top wall defining the inserting opening, a sidewall and a bottom wall commonly defining a receiving cavity to receive the terminal assembly and the elastic member, the bottom wall being made from metal plate and fitly retained with the sidewall;

the terminal assembly comprises a tube terminal, the tube terminal comprises a plurality of elastic contacting portions and a bottom ring, the plurality of contacting portions commonly defines the mating opening, and the bottom ring of the terminal assembly is electrically connected with the bottom wall of the case; and the elastic member directly presses against an outer periphery of the tube terminal.

5. The coaxial connector as claimed in claim 1, wherein:

the case comprises a top wall defines the inserting opening, and a sidewall and a bottom wall commonly defining a receiving cavity to receive the terminal assembly and the elastic member, and the bottom wall of the case is electrically connected with the terminal assembly;

the terminal assembly comprises a plurality of terminal units and an insulating tube retained to the plurality of terminal units, each terminal unit comprises an elastic contacting portions and an arc horizontal portion, the contacting portions commonly define the mating opening, and the arc horizontal portions are kept to slide along the bottom wall of the case; and the elastic member directly presses against an outer peripheral of the insulating tube.

6. The coaxial connector as claimed in claim 5, wherein the elastic member comprises a plurality of elastic arms pressing against the insulating tube.

7. The coaxial connector as claimed in claim 6, wherein the plurality of elastic arms comprises first elastic arms extending downwards and second elastic arms extending upwards.

8. The coaxial connector as claimed in claim 5, wherein the elastic member is a tower shape coil spring, the coil spring has a smallest coil at a top end thereof, and the smallest coil fits the plastic tube and other larger diameter coils surround the plastic tube with gaps.

9. A coaxial connector comprising:

a case comprising a top wall defining an inserting opening, a sidewall and a bottom commonly defining a receiving cavity, the bottom wall being made from conductive material and adapted for being non-moveably and electrically mounted on a printed circuit board;

a terminal assembly moveably received in the receiving cavity and electrically connected with the bottom wall of the case; and an elastic member disposed in the receiving cavity;

wherein the elastic member elastically presses against the terminal assembly to urge the terminal assembly to shift in a radial direction of the coaxial connector.

10. The coaxial connector as claimed in claim 9, wherein the bottom wall is fitly assembled with the sidewall of the case.

11. The coaxial connector as claimed in claim 9, wherein the terminal assembly includes a tube terminal, the tube terminal comprises elastic contacting portions bending inwards and downwards from a top edge thereof, and a bottom ring, the bottom ring is seated on the bottom wall of the case, and the contacting portions commonly define a mating opening facing the inserting opening of the case.

12. The coaxial connector as claimed in claim 9, wherein the terminal assembly includes elastic contacting portions commonly defining a mating opening facing the inserting opening and plural connecting portions, and the connecting portions elastically press downward an upper face of the bottom wall of the case to keep mechanically and electrically connecting with the bottom wall of the case.

13. The coaxial connector as claimed in claim 9, wherein the terminal assembly comprises a plastic tube retaining three terminal units, each terminal unit comprises a contacting portion and a connecting portion mechanically connecting with the bottom wall of the case, and the elastic member elastically presses against the plastic tube along the radial direction.

14. The coaxial connector as claimed in claim 9, wherein the elastic member comprises a tube base, plural first elastic arms slanting upwards from the tube base, and plural second elastic arms slanting downwards from the tube base.

15. The coaxial connector as claimed in claim 14, wherein the tube base defines two first slits through a lower edge thereof so as to define a first strip and each first elastic arm folds from a corresponding first strip, and two second slits through an upper edge thereof so as to define a second strip and each second elastic arm folds from a corresponding second strip.

16. The coaxial connector as claimed in claim 9, wherein the elastic member is a tower coil spring.

17. A coaxial connector comprising:

a case comprising a top wall defining an inserting opening, a sidewall and a bottom wall commonly defining a receiving cavity, the bottom wall being made from conductive material and adapted for being non-moveably and electrically mounted on a printed circuit board;

a terminal assembly received in the receiving cavity and electrically connected with the bottom wall of the case; and an elastic member disposed in the receiving cavity;

wherein the elastic member elastically presses against the terminal assembly and pushes the terminal assembly to shift to a position as determined by an inserted complementary connector.

18. The coaxial connector as claimed in claim 17, wherein the terminal assembly is shiftable in a radial direction of the coaxial connector.

* * * * *